(12) United States Patent
An et al.

(10) Patent No.: US 8,213,324 B2
(45) Date of Patent: Jul. 3, 2012

(54) METHOD FOR TRANSMITTING AND RECEIVING BCMCS INFORMATION

(75) Inventors: Jong Hoe An, Seoul (KR); Young Jun Kim, Gyeonggi-do (KR); Chan Ho Kyung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 11/911,105

(22) PCT Filed: Apr. 10, 2006

(86) PCT No.: PCT/KR2006/001300
§ 371 (c)(1),
(2), (4) Date: Jun. 23, 2010

(87) PCT Pub. No.: WO2006/109961
PCT Pub. Date: Oct. 19, 2006

(65) Prior Publication Data
US 2011/0002254 A1    Jan. 6, 2011

(30) Foreign Application Priority Data

Apr. 9, 2005   (KR) .................. 10-2005-0029747

(51) Int. Cl.
*H04L 12/56* (2006.01)
*H04L 1/16* (2006.01)
(52) U.S. Cl. ......... 370/252; 370/230; 370/329; 370/390
(58) Field of Classification Search .................. 370/252, 370/329, 230, 390
See application file for complete search history.

(56) References Cited

U.S. PATENT DOCUMENTS

| 4,688,035 | A | 8/1987 | Gray et al. |
| 5,663,721 | A | 9/1997 | Rossi |
| 2003/0147393 | A1 | 8/2003 | Stewart |
| 2005/0122938 | A1* | 6/2005 | Kim et al. ..................... 370/335 |

FOREIGN PATENT DOCUMENTS

| KR | 10-2003-0018463 | 3/2003 |
| WO | WO 00/78054 | 2/2000 |
| WO | 00/78054 | 12/2000 |

OTHER PUBLICATIONS

R. Sinnarajah, "NUM_FLOW_DISCRIMINATOR inclusion," TSG-C SWG2.3, Oct. 2004.

* cited by examiner

*Primary Examiner* — John Pezzlo
(74) *Attorney, Agent, or Firm* — Lee, Hong, Degerman, Kang & Waimey

(57) ABSTRACT

A broadcast/multicast service information receiving method and broadcast/multicast service information transmitting method using the same are disclosed. The present invention includes the steps of receiving length information of a BCMCS component flow discriminator (BCMCS Flow Discriminator) configuring a BCMC service flow identifier (BCMCS Flow Identifier) and receiving information for a number of BCMCS component flow discriminators configuring the BCMC service flow identifier using a bit number corresponding to a value of the length information of the BCMCS component flow discriminator. Accordingly, the information for the BCMCS component flow identifier can be efficiently transmitted and received.

12 Claims, 4 Drawing Sheets

| ProgramCount | 6 |
|---|---|

ProgramCount occurrences of the following variable-length record :

| ProgramIDLSBLength | 5 |
| ProgramIDLSBs | ProgramIDLSBLength |
| FlowDiscriminatorLength | 0 or 3 |
| FlowDiscriminatorCount | FlowDiscriminatorLength |
| RegisterForPaging 1 | 0 or 1 |
| RegisterForDynamicBroadcast 1 | 0 or 1 |
| AdditionalCDMAChannelCount 1 | 0 or 3 |

Zero or one occurrence of the following record :

| ProgramCount | 0 or 6 |
|---|---|
| ProgramCount occurrences of the remaining fields (except Reserved field) : | |
| ProgramIDLSBLength | 0 or 5 |
| ProgramIDLSBs | 0 or ProgramIDLSBLength |
| FlowDiscriminatorLength | 0 or 3 |
| FlowDiscriminatorCount | FlowDiscriminatorLength |
| BAKSequenceNumber 1 | 0 or 4 |
| AuthSignatureIncluded 1 | 0 or 1 |
| AuthSignature 1 | 0 or 32 |

FlowDiscriminatorCount occurrences of the following three fields :

| FlowDiscriminator | 0 or FlowDiscriminatorLength |
|---|---|
| AuthSignatureIncluded 2 | 0 or 1 |
| BAKSequenceNumber 2 | 0 or 4 |
| AuthSignature 2 | 0 or 32 |

Zero or one occurrence of the following record :

| | |
|---|---|
| ProgramCount | 0 or 6 |
| ProgramCount occurrences of the remaining fields (except the Reserved field) : | |
| ProgramIDLSBLength | 0 or 5 |
| ProgramIDLSBs | 0 or ProgramIDLSBLength |
| FlowDiscriminatorLength | 0 or 3 |
| FlowDiscriminatorCount | FlowDiscriminatorLength |
| ProgramRejectReason | 0 or 4 |

FlowDiscriminatorCount occurrences of the following three fields :

| | |
|---|---|
| FlowDiscriminator | 0 or FlowDiscriminatorLength |
| RejectSameAsPreviousFlow | 0 or 1 |
| FlowRejectReason | 0 or 4 |

[ ... ]

METHOD FOR TRANSMITTING AND RECEIVING BCMCS INFORMATION

CROSS-REFERENCE TO RELATED APPLICATIONS

This application is the National Stage filing under 35 U.S.C. 371 of International Application No. PCT/KR2006/001300, filed on Apr. 10, 2006, which claims benefit of earlier filing date and right of priority to Korean Application No. 10-2005-0029747, filed in Apr. 9, 2005.

TECHNICAL FIELD

The present invention relates to a method of receiving broadcast/multicast service information, and more particularly, to a method of transmitting/receiving information for a BCMC component flow identifier efficiently.

BACKGROUND ART

Generally, in a mobile communication system supporting BCMC, since multimedia data such as audio and video should be transmitted, a high data rate is required. So, in order to perform a broadcast/multicast (hereinafter abbreviated BCMC) service, a packet data channel of a physical layer needs to support a high data rate. In a current mobile communication system, BCMC data transported via packet data channels of a previously existing physical layer.

If contents to be broadcast are generated from a base station or forwarded to the base station from another place, the base station transmits the contents to a radio channel using a protocol negotiated between the base station and a mobile subscriber station to enable a plurality of users within the base station area to view or listen to the contents.

For instance, messages exchanged for BCMC service execution between a base station and mobile subscriber stations include a broadcast overhead message, a broadcast registration message and a broadcast reject message.

The broadcast overhead message is a message that is transmitted in common to mobile subscriber stations from a base station. And, the broadcast overhead message contains information enabling a corresponding mobile subscriber station to stably receive a packet data channel or a broadcast channel and to perform decoding. For instance, the information transmitted via the broadcast overhead message includes information for contents of a BCMC service, information for a channel used for BCMC, mobile subscriber station registration information and the like. These informations are periodically transmitted via the broadcast overhead message and the mobile subscriber station receiving the BCMC service should receive the broadcast overhead message.

The broadcast registration message is a message transmitted from a mobile subscriber station to a base station. And, the broadcast registration message carries information for a BCMC service flow to be received by a mobile subscriber station to a base station. And, the broadcast reject message is a message transmitted to a mobile subscriber station from a network in response to the broadcast registration message. The broadcast reject message contains information for a service-rejected BCMC flow among a plurality of BCMCS flows requested using the broadcast registration message. Meanwhile, information indicating that services of all BCMCS flows requested by a mobile subscriber station are allowed can be transmitted through a specific field value of the broadcast reject message.

Each of the broadcast overhead message, the broadcast registration message and the broadcast reject message includes FlowDiscriminatorCount field. One BCMC service flow has at least one BCMCS configuration component flow. And, the FlowDiscriminatorCount field contains information for a number of BCMCS configuration component flows configuring one BCMC service.

And, each of the broadcast overhead message, the broadcast registration message and the broadcast reject message includes BCMCSFlowDiscriminator field for discriminating a BCMC component flow.

However, since a value of the FlowDiscriminatorCount field indicating information for the BCMCS flow number is fixed to 6 bits, it is unable to transmit the information for the BCMC component flow efficiently.

DISCLOSURE OF THE INVENTION

To achieve these and other advantages and in accordance with the purpose of the present invention, as embodied and broadly described, in receiving information for receiving a broadcast/multicast (BCMC) service, a broadcast/multicast service information receiving method according to the present invention includes the steps of receiving length information of a BCMCS component flow discriminator (BCMCS Flow Discriminator) configuring a BCMC service flow identifier (BCMCS Flow Identifier) and receiving information for a number of BCMCS component flow discriminators configuring the BCMC service flow identifier using a bit number corresponding to a value of the length information of the BCMCS component flow discriminator.

To further achieve these and other advantages and in accordance with the purpose of the present invention, in a broadcast/multicast (BCMC) data service, a method of transmitting broadcast/multicast data service support information includes the steps of setting length information of a BCMCS component flow discriminator (BCMCS Flow Discriminator) configuring a BCMC service flow identifier (BCMCS Flow Identifier) and setting information for a number of BCMCS component flow discriminators configuring the BCMC service flow identifier using a bit number variable according to a length of the BCMCS component flow discriminator.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a structural diagram of a broadcast overhead message in part according to one embodiment of the present invention;

FIG. 3 is a structural diagram of a broadcast registration message in part according to on embodiment of the present invention; and FIG. 4 is a structural diagram of a broadcast reject message in part according to one embodiment of the present invention.

BEST MODE FOR CARRYING OUT THE INVENTION

Figure 1:
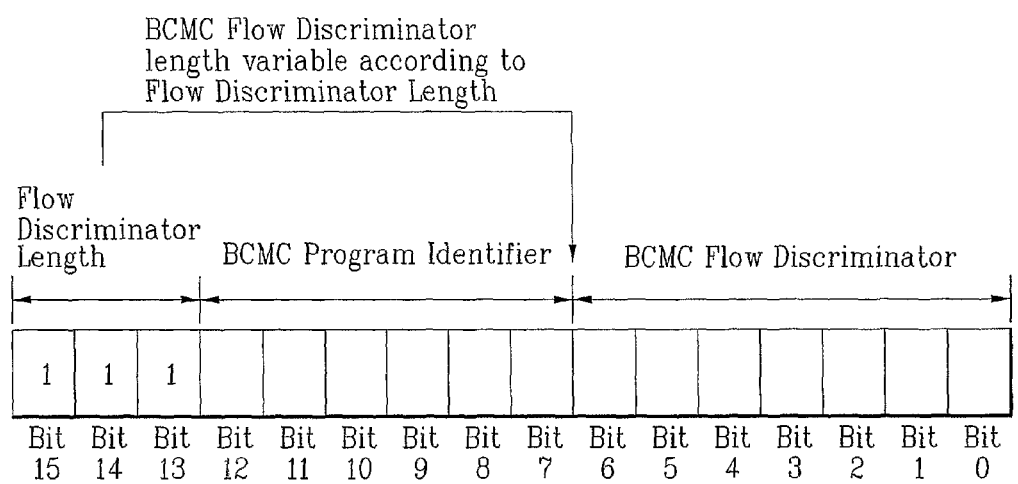
FIG. 1 is a structural diagram of a BCMC service flow identifier according to one embodiment, in which BCMCS-FlowFormat has a value of '1'.

Reference will now be made in detail to the preferred embodiments of the present invention, examples of which are illustrated in the accompanying drawings.

A broadcast overhead message, a broadcast registration message or a broadcast reject message includes BCMCSFlowFormat field to indicate a configuration method of a BCMC service (BCMCS) flow identifier.

For instance, if the BCMCSFlowFormat field is set to '1', the BCMCS flow identifier includes a BCMCS program identifier indicating a BCMC program, a BCMCS flow discriminator discriminating a BCMCS component flow configuring the BCMCS program and a Flow Discriminator Length field indicating a length of the BCMCS component flow discriminator.

FIG. 1 is a structural diagram of a BCMC service flow identifier according to one embodiment, in which BCMCSFlowFormat has a value of '1'. FIG. 1 shows a BCMCS flow identifier having a 16-bit length. And, FIG. 1 shows a case that a value of Flow Discriminator Length within BSPM is '111', i.e., a length of a BCMCS flow discriminator is 7.

Referring to FIG. 1, a BCMCS flow identifier includes a Flow Discriminator Length field indicating a length of a BCMCS flow discriminator, a BCMCS program identifier and a BCMCS component flow discriminator.

The BCMCS program identifier indicates a specific BCMC service program and the BCMCS flow discriminator indicates a component flow configuring a specific BCMCS program. For example, in case of an audiovisual program, each audiovisual program can be identified by the BCMCS program identifier. Meanwhile, each audio stream and video stream configuring one audiovisual program can be discriminated by the BCMCS component flow discriminator.

In FIG. 1, the Flow Discriminator Length filed has a 3-bit length and can be set to one of '000' to '111'. A length of the BCMCS component flow discriminator is determined by a value of the Flow Discriminator Length field. For instance, if the Flow Discriminator Length field is set to '000', the BCMCS component flow discriminator does not exist. If a BCMC Flow Discriminator Length field is set to '111', the BCMCS component flow discriminator ha a 7-bit length.

Meanwhile, if the BCMCSFlowFormat has a value of '0', the BCMCS component flow identifier is configured regardless of the BCMCS program identifier and the BCMCS component flow discriminator.

In case that FlowDiscriminatorCount filed included in a broadcast overhead message, a broadcast registration message, a broadcast reject message or the like is fixed to a specific bit, e.g., 6-bit, six bits have to be transmitted despite a small number of BCMCS component flow discriminators.

Although it is possible to set the number of BCMCS component flow discriminators to a maximum of 128, if the FlowDiscriminatorCount filed is fixed to 6-bit, it is able to represent maximum 64 BCMCS component flows only.

So, in configuring Flow Discriminator Length field and FlowDiscriminatorCount fields of a broadcast overhead message, a broadcast registration message or a broadcast reject message, the Flow Discriminator Length field is preferentially configured and the FlowDiscriminatorCount field is then configured to correspond to the Flow Discriminator Length field.

FIG. 2 is a structural diagram of a broadcast overhead message in part according to one embodiment of the present invention. In FIG. 2, ProgramCount field is a field to indicate a number of BCMCS programs. ProgramIDLSBLength field means a number of ProgramID least significant bits if BCMCSFlowFormat is '1'. ProgramIDLSBs field is set to a value of ProgramIDLSBLength if BCMCSFlowFormat is '1'. FlowDiscriminatorCount field and Flow Discriminator Length field are identical those explained in the foregoing description.

RegisterForPaging1 field is a field that is set to '1' in case that BCMCS flow belonging to a specific program needs to be included in BCMCSFlowRegistration message for a base station to allow a mobile subscriber station to send a message via a suitable CDMA channel. RegisterForDynamicBroadcast1 field is a field that is set to '1' if BCMCS flow belonging to a specific program needs to be included in BCMCSFlowRegistration message for allowing a message, which dynamically allocates BCMCS flows or releases allocation of BCMCS flows, to be sent via a physical channel. AdditionalCDMAChannelCount1 fields means a number of additional channels carrying BCMCS program.

FIG. 3 is a structural diagram of a broadcast registration message in part according to one embodiment of the present invention.

In FIG. 3, the meanings of the respective fields are explained as follows.

First of all, ProgramCount field is a field to indicate a number of BCMCS programs if BCMCSFlowFormat is '1'. ProgramIDLSBLength field means a number of ProgramID least significant bits if BCMCSFlowFormat is '1'. ProgramIDLSBs field is set to a value of ProgramIDLSBLength if BCMCSFlowFormat is '1'. FlowDiscriminatorCount field and Flow Discriminator Length field are identical those explained in the foregoing description.

BAKSequenceNumber1 field means a sequence number of BroadcastAccessKey to generate AuthSignature for a BCMCS program. AuthSignatureIncluded1 field has a value of '1' if authorization signature for BCMCS flow is included. AuthSignature1 field is a field indicating a value of AuthSignature. AuthSignatureIncluded2 field has a value of '1' if authorization signature for BCMCS flow is included. BAKSequenceNumber2 field means a sequence number of BroadcastAccessKey to generate AuthSignature for a BCMCS program. AuthSignature2 field is a field indicating a value of AuthSignature.

FIG. 4 is a structural diagram of a broadcast reject message in part according to one embodiment of the present invention. In FIG. 4, the meanings of the respective fields are explained as follows.

First of all, ProgramCount field is a field to indicate a number of BCMCS programs if BCMCSFlowFormat is '1'. ProgramIDLSBLength field means a number of ProgramID least significant bits if BCMCDFlowFormat is '1'. ProgramIDLSBs field is set to a value of ProgramIDLSBLength if BCMCSFlowFormat is '1'. FlowDiscriminatorCount field and Flow Discriminator Length field are identical those explained in the foregoing description.

ProgramRejectReason field is to indicate a program reject reason if BCMCSFlowFormat is '1' and if FlowDiscriminatorCount is not '000000'. RejectSameAsPreviousFlow field is a field that is set to '1' if it is the same of a reject reason of a previous BCMCS flow. FlowRejectReason field is to indicate a program reject reason if BCMCSFlowFormat is '1'.

As shown in FIGS. 2 to 4, Flow Discriminator Length field is preferentially constructed with 0 bit or 3 bits and FlowDiscriminatorCount field is then constructed with a bit number corresponding to 0 bit or a value of the Flow Discriminator Length field.

For instance, if Flow Discriminator Length field is constructed with 3 bits, assuming that a value of Flow Discriminator Length field is set to '100', FlowDiscriminatorCount field can be represented as 4 bits. So, if a BCMCS component flow discriminator included in BCMCS flow identifier has a 4-bit length, maximum 16 BCMCS component flow discriminators can be represented. And, FlowDiscriminatorCount field represented as 4 bits can represent maximum 16 BCMCS component flow discriminators included in BCMCS flow identifier as well.

So, if the bit number of FlowDiscriminatorCount field matches a value of Flow Discriminator Length field without being fixed to a prescribed value, the broadcast overhead message, broadcast registration message and broadcast reject message can be more efficiently configured.

INDUSTRIAL APPLICABILITY

Accordingly, the present invention relating to a broadcast/multicast service information receiving method is applicable to a mobile communication system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. In receiving information for receiving a broadcast/multicast (BCMC) service, a broadcast/multicast service information receiving method, comprising the steps of:
   receiving length information of a BCMC service component flow discriminator configuring a BCMC service flow identifier; and
   receiving information for a number of BCMC service component flow discriminators configuring the BCMC service flow identifier using a bit number corresponding to a value of the length information of the BCMC service component flow discriminator.

2. The broadcast/multicast service information receiving method of claim 1, wherein the length information of the BCMC service component flow discriminator and the information for the number of BCMC service component flow discriminators are received via at least one of a broadcast overhead message, a broadcast registration message and a broadcast reject message.

3. The broadcast/multicast service information receiving method of claim 1, wherein the BCMC service flow identifier includes information for a length of the BCMC service component flow discriminator, information for a BCMCS program and the BCMC service component flow discriminator.

4. The broadcast/multicast service information receiving method of claim 1, wherein after receiving and decoding the length of the BCMC service component flow discriminator, the information for the number of the BCMC service component flow discriminators are received and decoded.

5. The broadcast/multicast service information receiving method of claim 1, wherein the information for the number of the BCMC service component flow discriminators configuring the BCMC service flow identifier using bits amounting to a same number of the value of the length information of the BCMC service component flow discriminator are received.

6. The broadcast/multicast service information receiving method of claim 1, wherein the value of the length information of the BCMC service component flow discriminator has a value except zero.

7. The broadcast/multicast service information receiving method of claim 1, wherein the length information of the BCMC, service component flow discriminator is received via a Flow DiscriminatorLength Field and wherein the information for the number of the BCMC service component flow discriminators is received via a Flow Discriminator Count field.

8. The broadcast/multicast service information receiving method of claim 7, wherein the length information of the BCMC service component flow discriminator is represented as a 3-bit length.

9. In a broadcast/multicast (BCMC) data service, a method of transmitting broadcast/multicast data service support information, comprising the steps of:
   setting length information of a BCMC service component flow discriminator configuring a BCMC service flow identifier; and
   setting information for a number of BCMC service component flow discriminators configuring the BCMC service flow identifier using a bit number variable according to a length of the BCMCS component flow discriminator.

10. The method of claim 9, wherein the length information of the BCMC service component flow discriminator and the information for the number of BCMC service component flow discriminators are received via at least one of a broadcast overhead message, a broadcast registration message and a broadcast reject message.

11. The method of claim 10, wherein the length information of the BCMCS component flow discriminator is received via a BCMCS Flow DiscriminatorLength Field and wherein the information for the number of the BCMC service component flow discriminators is received via a BCMC service Flow Discriminator Count field.

12. The method of claim 9, wherein the length information of the BCMC service component flow discriminator is represented as a 3-bit length.

* * * * *